United States Patent [19]
Streib et al.

[11] Patent Number: 5,505,671
[45] Date of Patent: Apr. 9, 1996

[54] METHOD FOR CONTROLLING THE OPERATING SEQUENCES OF A MOTOR VEHICLE EQUIPPED WITH AN AUTOMATIC TRANSMISSION

[75] Inventors: Martin Streib, Vaihingen; Hong Zhang, Schwieberdingen, both of Germany

[73] Assignee: Robert Bosch GmbH, Stuttgart, Germany

[21] Appl. No.: 299,363

[22] Filed: Sep. 1, 1994

[30] Foreign Application Priority Data

Sep. 4, 1993 [DE] Germany ............ 43 29 916.4

[51] Int. Cl.$^6$ .................................. B60K 41/04
[52] U.S. Cl. ...................... 477/115; 477/109; 477/121
[58] Field of Search .................... 477/115, 118, 477/121, 109, 110, 94

[56] References Cited

U.S. PATENT DOCUMENTS

| | | | |
|---|---|---|---|
| 4,258,591 | 3/1981 | Eckert et al. | |
| 4,311,123 | 1/1982 | Glöckler et al. | |
| 5,054,450 | 10/1991 | Oota et al. | 477/111 X |
| 5,146,891 | 9/1992 | Nakazawa et al. | 477/107 X |
| 5,186,080 | 2/1993 | Simon, Jr. et al. | 477/109 |
| 5,249,484 | 10/1993 | Matsuoka et al. | 477/121 |
| 5,323,318 | 6/1994 | Hasegawa et al. | 477/94 X |

FOREIGN PATENT DOCUMENTS 4122083 12/1992 Germany.

*Primary Examiner*—Charles A. Marmor
*Assistant Examiner*—Peter Kwon
*Attorney, Agent, or Firm*—Walter Ottesen

[57] ABSTRACT

The invention is directed to a method for controlling the operating sequences in a motor vehicle equipped with an internal combustion engine to which amounts of fuel and air are supplied for influencing the engine torque. Furthermore, the motor vehicle includes an automatic transmission having a ratio which can be changed. The overrun operation of the motor vehicle is detected in dependence upon the position of an accelerator pedal actuated by the driver and in dependence upon a comparison of the rpm of the engine and/or the input and/or the output rpm of the transmission to at least one threshold value. The fuel quantity is at least reduced compared to normal operation when an overrun is detected. The essence of the invention is that, when overrun operation of the vehicle is detected, a downshift operation of the transmission is triggered in dependence upon the further comparison of the rpm of the engine and/or the input and/or output rpms of the transmission to at least the above-mentioned threshold value or a further threshold value. In this way, the braking torque of the engine acting at the transmission output is significantly increased within a short time. Furthermore, the downshift operation can be configured to more comfortable by a short-term increase of the engine torque.

10 Claims, 5 Drawing Sheets

METHOD FOR CONTROLLING THE OPERATING SEQUENCES OF A MOTOR VEHICLE EQUIPPED WITH AN AUTOMATIC TRANSMISSION

BACKGROUND OF THE INVENTION

From the state of the art, as exemplified by U.S. Pat. No. 4,311,123, it is known to detect overrun operation of a motor vehicle in that, for a closed throttle flap, the engine rpm exceeds a specific value. This is the case, for example, in downhill driving when the operator removes the foot from the accelerator pedal. Generally, the term overrun operation is, however, broader because it is always then applied when the motor vehicle decelerates only because of a partial release of the accelerator pedal. For this, it is not absolutely necessary that the throttle flap be completely closed. It is only essential that the rpm in overrun operation is greater than that value which would adjust continuously in the case of normal operation for the particular position of the accelerator pedal. It is known, when detecting overrun operation, to reduce the metering of fuel at the start of this overrun operation in accordance with a selectable function and, if required, to reduce the metering of fuel to zero and, at the end or after the end of overrun operation, to again permit the metering of fuel to resume pursuant to a selectable function. The end of the overrun operation is generally detected by a drop below a lower engine rpm threshold (resume rpm).

For motor vehicles equipped with an automatic transmission, a gear stage is selected generally in dependence upon the load state and the speed of the motor vehicle. If the motor vehicle is in the above-mentioned overrun operation, then an upshift operation can be triggered based on the shift characteristic lines. This reduces the braking action of the engine which is wanted in overrun operation. To avoid these disadvantages, upshift operations of the automatic transmission are prevented when there is a jolt-like withdrawal of the accelerator pedal. In this connection, reference may be made to U.S. Pat. No. 4,258,591.

A safety system for motor vehicles is disclosed in German patent publication 4,122,083. In this system, a deceleration of the motor vehicle is indicated by a timely downshift before a pregiven engine rpm limit is exceeded. For this purpose, this safety system warns the driver before the highest engine rpm is reached when driving downhill and when there is an appropriately heavy load so that the driver can perform the required downshift.

The following operating sequence is to be observed for a motor vehicle equipped with an automatic transmission and a fuel cutoff in overrun operation. If one permits a motor vehicle equipped with a spark-ignition engine, gasoline injection and an automatic transmission to simply roll from a higher speed (accelerator pedal position essentially at zero), then an engine rpm adjusts depending upon the gear which is engaged (at high speed, the highest gear as a rule). At high speed, the rpm is usually so high that, when the accelerator pedal is partially released, the injection carries out an overrun cutoff. Generally, this reduces the consumption of fuel to zero. If the roadway does not have a steep drop, the speed and therefore the engine rpm drop slowly until the engine rpm drops below the threshold for resuming injection. On the one hand, the braking action of the engine drops while, on the other hand, the consumption of fuel increases. Since the braking action of the engine is mostly wanted in city traffic (otherwise, the missing deceleration must be increasingly provided by the brakes), the resumption of injection has negative consequences. If the speed drops still further, the automatic transmission shifts into a lower gear. In this way, the engine rpm increases somewhat, however, the downshift thresholds lie so low at low speeds that the rpm always remains below the threshold for the overrun cutoff.

SUMMARY OF THE INVENTION

It is an object of tile invention to optimize operating conditions for overrun operation in a motor vehicle equipped with an automatic transmission.

The invention proceeds from a method for controlling a motor vehicle having an internal combustion engine to which a quantity of fuel and a quantity of air are metered for influencing the engine torque. Furthermore, the motor vehicle includes an automatic transmission having ratios which can be changed. The overrun operation of the vehicle is detected in dependence upon the position of an accelerator pedal actuable by the driver and in dependence upon a comparison of the rpm of the engine and/or of the input rpm and/or the output rpm of the transmission to at least one threshold value. The fuel quantity is at least reduced with respect to normal operation when detecting an overrun operation.

The essence of the invention is that a downshift operation of the transmission is triggered for a detected overrun operation of the vehicle in dependence upon a further comparison of the rpm of the engine and/or of the input rpm and/or tile output rpm of the transmission to at least the above-mentioned threshold value or a further threshold value.

The advantages of the invention will now be explained.

The following operation is activated when the transmission is in a higher gear, the accelerator pedal is essentially in its rest position and the injection control carries out an overrun cutoff. If the engine rpm drops below the resume threshold of the injection (or, alternatively, if the engine rpm drops below a second threshold which exhibits a value above the resume rpm), then the automatic transmission is downshifted one gear when the accelerator pedal is in its rest position as previously. With the downshift of the transmission, the braking torque of the engine acting at the transmission output clearly increases within a short time.

It is especially advantageous that the fuel quantity is again at least reduced compared to normal operation after the downshift operation is triggered and after overrun operation is again detected. When the engine rpm after the downshift operation again increases above the resume threshold, then an overrun cutout is triggered anew. This affords the advantage that fuel is saved in addition to the high braking torque acting at the output of the transmission.

When the motor vehicle rolls with a non-actuated accelerator pedal, the proportion of the overrun cutoff phases (or at least the phases of reduced metering of fuel) is increased by the downshift operation and therefore fuel is saved. The greater braking action of the drive train occurring thereby is, in most cases, wanted and reduces the load on the operating brakes.

The increase of the braking torque after the downshift operation is, in most cases desirable. However, for reasons of comfort, this increase should not take place abruptly. It is therefore advantageous that the engine torque is increased with respect to the engine torque present during overrun operation a short time before or a short time after or simultaneously with the triggering of the downshift operation. The downshift operation is therefore configured to be comfortable in that the fuel reduction (in general, the overrun cutoff) is reduced during or directly in advance or directly after downshifting.

Thus, and advantageously, the increase of the engine torque is achieved with the aid of an air-fuel mixture quantity which is greater when compared to the overrun operation. More specifically, a higher mixture quantity is supplied for a short time to the engine than the idle quantity which is in addition to downshifting. This can take place, for example, by opening an electrically actuable throttle flap (E-gas) or by driving an idle actuator (in a limited scope). In this way, the situation is prevented that a higher vehicle deceleration builds up abruptly by downshifting than was effective in advance of the downshifting. Such an active revving-up function furthermore causes the kinetic energy, which the engine requires for increasing its rpm, to be developed by the engine itself and is not taken from the kinetic energy of the vehicle. In this way, the occurrence of a downshift jolt is avoided and a comfortable jolt-free downshift operation is provided.

Furthermore, and after the increase, the engine torque can again be reduced with any desired selectable time-dependent function or a function dependent upon the operating parameters of the motor vehicle. More specifically, the air-fuel mixture quantity is continuously controlled down to the idle quantity. The overrun cutoff can be again triggered as soon as the idle quantity is reached.

Advantageously, the engine torque is reduced after the increase in the form of a ramp within a selectable time.

A further advantageous configuration of the invention provides that downshift operation is only triggered with an actuation of the brake by the driver of the motor vehicle. This configuration considers that there are cases wherein rolling of the vehicle in high gear with the idle mixture quantity or with fuel metering cut off is better adapted to the traffic situation than downshifting into a lower gear followed by overrun cutoff. In order to consider these situations, the above-described function can be additionally coupled to a braking pedal signal in that the function is only activated when the driver actuates the brake pedal. In this way, the driver signals that a brake actuation is in any event wanted.

A further feature of the invention is the downshifting into a lower gear while the brake is actuated even when the engine rpm is significantly above the resume threshold. In this way, the brakes are relieved of load, for example, during driving on mountain passes.

The invention further relates to an arrangement for carrying out the method of the invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
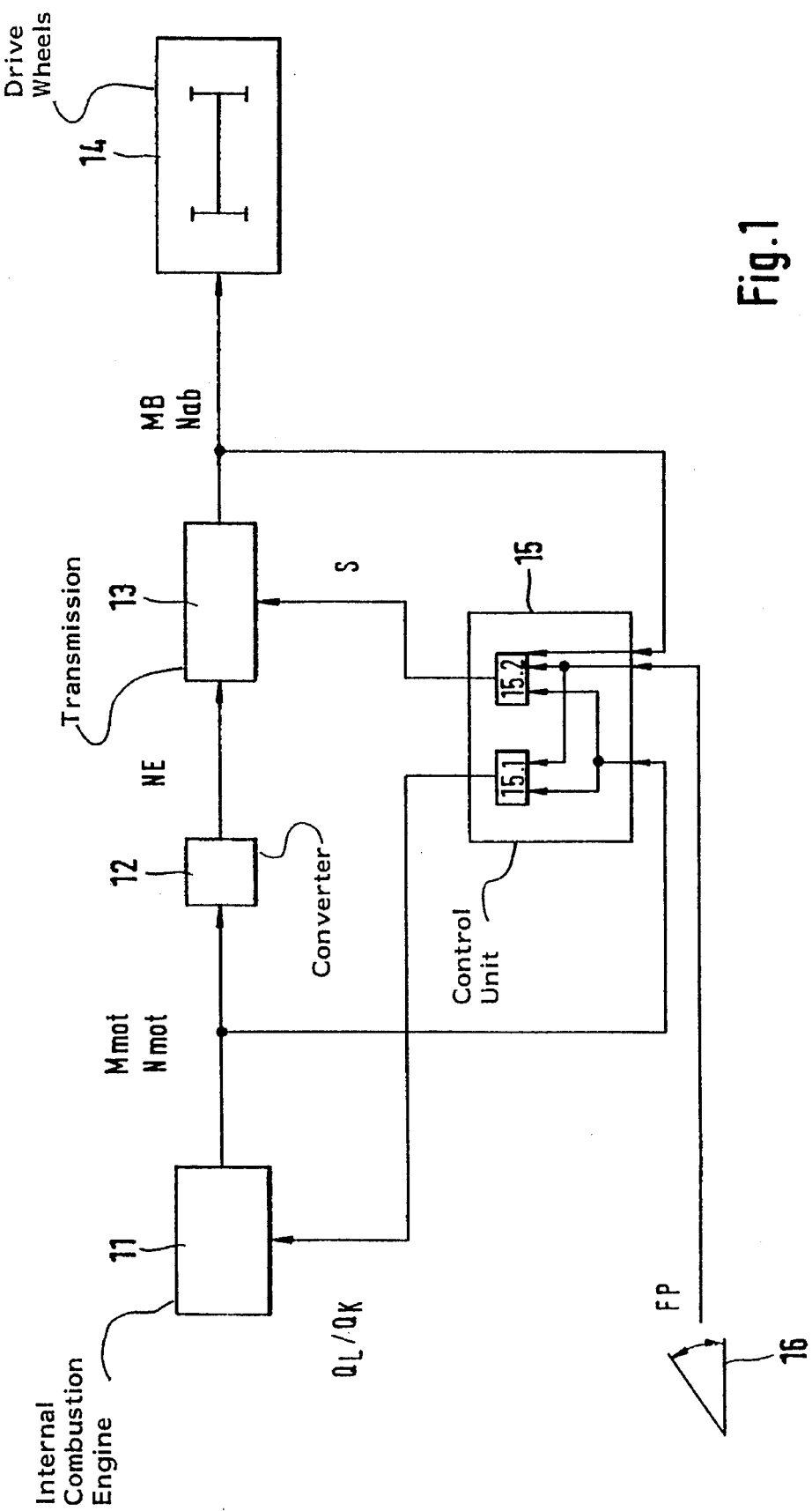
FIG. 1 is a block circuit diagram of the arrangement of the invention.

FIG. 1 shows an internal combustion engine 11 which supplies the engine rpm Nmot and the engine torque Mmot at its output end to the converter 12. The transmission input rpm NE is present as an input signal for the transmission 13 at the output end of the converter 12. The transmission output rpm Nab is present at the output end of the transmission 13 and acts on the drive wheels of the vehicle 14. In the overrun operation of the vehicle, which is important for the invention, a braking torque MB effected by the engine 11 is present at the output end of the transmission 13. This braking torque MB acts via the drive wheels on the vehicle 14.

With the aid of the control unit 15, the various ratios of the transmission 13 can be selected by means of the signal S. Furthermore, the fuel quantity fuel/air ($Q_L/Q_K$) for the engine 11 can be controlled (open loop or closed loop) via the control unit 15. At the input end of the control unit 15, at least a signal of the engine rpm Nmot is present and the position of the accelerator pedal 16 in the form of the signal FP is present. The control unit 15 can be provided as a single control apparatus or the control unit 15 can, for example, comprise two control units 15.1 and 15.2 with the one control unit 15.1 being provided for the engine control (open loop or closed loop) and the other control unit 15.2 being provided for the transmission control. Only those signals are presented in FIG. 1 as input signals for the control unit 15 which are relevant for the subject matter of the invention in the context of this embodiment. For the normal operation of the vehicle, as a rule, additional input signals are used for metering fuel or metering air or determining ignition time, on the one hand, or for selecting the transmission ratio, on the other hand. The ratio of the transmission 13 is generally selected in dependence upon the engine load or the propelling torque wanted the driver via the accelerator pedal 16 and from the road speed of the vehicle. The control (open loop or closed loop) of the internal combustion engine 11 is provided generally in dependence upon various operating variables of the engine.

A first embodiment of the invention will now be explained with respect to FIGS. 2 and 3. Here, FIG. 3 shows the method which takes place in the control unit 15 and especially in the transmission control 15.2. In step 31, an inquiry is first made as to the conditions for the overrun operation. For this purpose, a determination is made as to whether the accelerator pedal actuated by the driver is in the idle position (FP=0) and if the engine rpm Nmot is greater than the resume rpm Ng. If this is the case, that is, if an overrun operation (wherein, in this embodiment, a fuel cutoff or overrun cutoff is undertaken) is present, an inquiry is made in step 32 as to whether the engine rpm Nmot is less than the resume rpm Ng. As an alternative, it can be provided in the method that, in step 32, the engine rpm Nmot is compared to a higher rpm (Ng+offset) than the resume rpm Ng.

The term "resume rpm Ng" refers to that rpm at which the metering of fuel, which was cut off in overrun operation, is resumed when the rpm has dropped below the engine rpm Nmot. If the engine rpm Nmot drops below the resume rpm or the higher rpm threshold (step 32), then, in step 33, a downshifting operation from the higher gear i into the lower gear (i–1) is triggered in the transmission 13 via the transmission control 15.2, more specifically, by a corresponding signal S.

In a further step 34, an inquiry is made as to whether the engine rpm Nmot exceeds the resume rpm threshold Ng because of the downshift operation. This is generally the case after such a downshift operation. In this case, in step 35, either an overrun cutoff is then again triggered when, shortly before the downshift operation (step 33) the fuel supply has again resumed for a short time or the overrun cutoff is maintained if, in step 32, the engine rpm was compared to the higher threshold (Ng+offset). This program sequence is shown in FIG. 3 and runs during the overrun operation of the motor vehicle.

Figure 2:
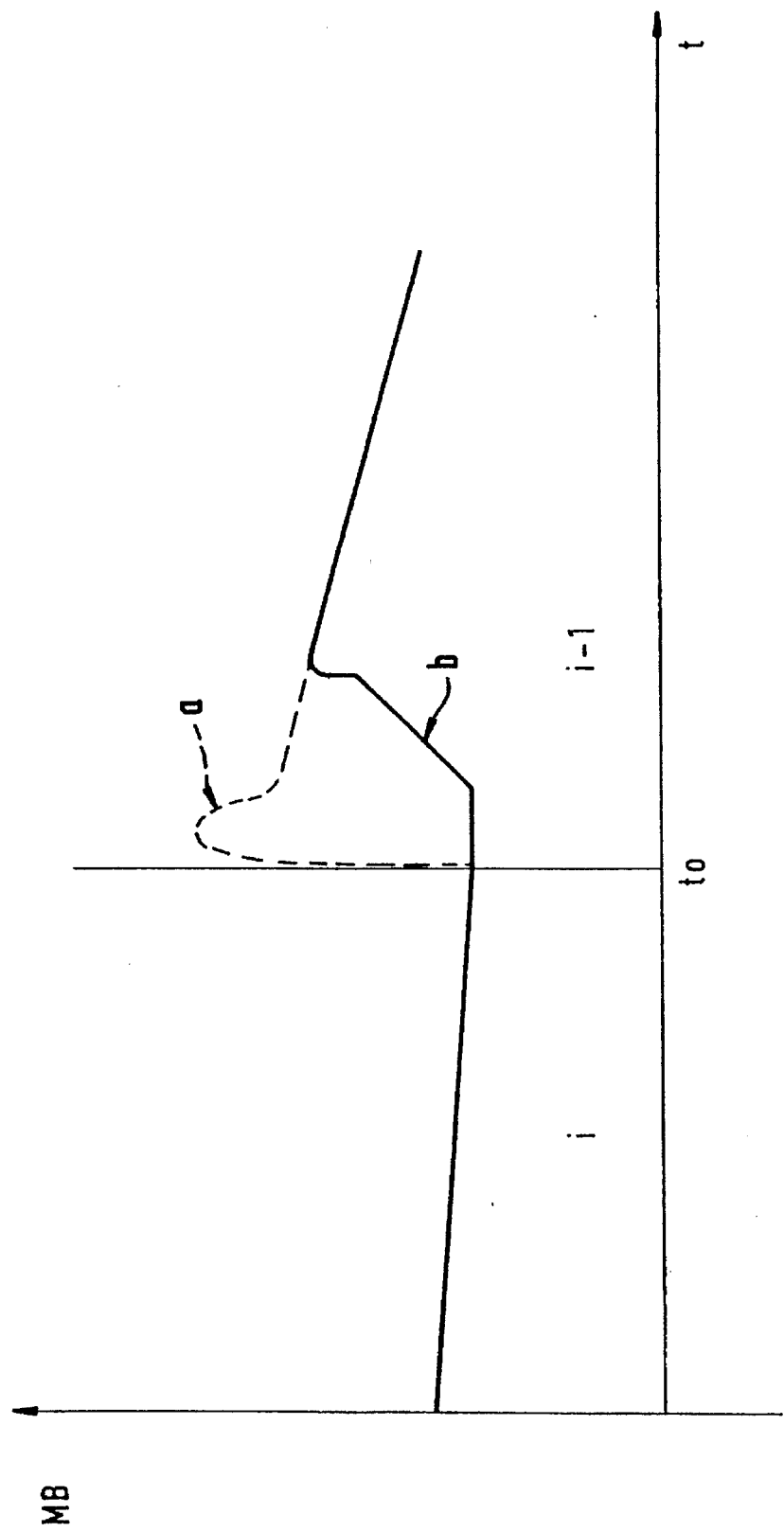
FIGS. 2 and 4 show time-dependent curves of various operating/parameters of the motor vehicle while performing the method of the invention; and, FIGS. 3 and 5 show sequence diagrams corresponding to FIGS. 2 and 4, respectively.
Figure 3:
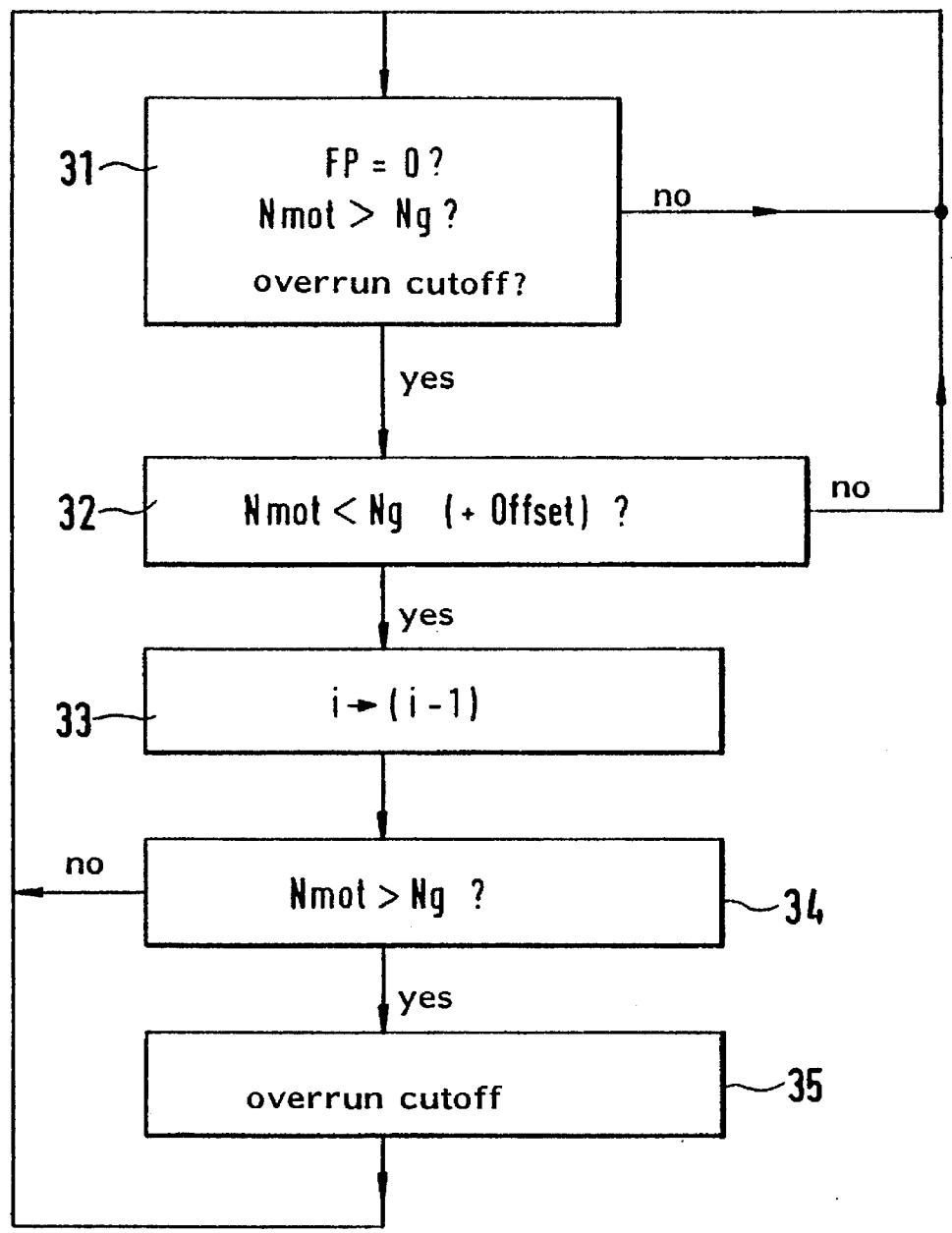

With this procedure, the brake torque MB is clearly increased by the downshift within a short time as shown in FIG. 2. This braking torque MB acts at the output of the transmission 13. In FIG. 2, the braking torque MB is plotted as a function of time (t). In the left-hand portion of FIG. 2, the acting brake torque MB is shown shortly before reaching the resume rpm or the higher threshold. At this time, the motor vehicle moves at the higher transmission ratio (i). If a downshift operation at time to into the lower gear (i−1) is now triggered by the inquiry in step 32 (FIG. 3), then the braking torque MB essentially follows the curve (a) of FIG. 2 which is shown by the broken line. Accordingly, a clear increase of the braking torque MB takes place in a short time. This increase of the braking torque is, in most cases, desirable. However, for reasons of comfort, it should not take place suddenly.

In a second embodiment, the above situation is taken into account in that the downshift operation is configured so as to be more comfortable. For this purpose, the overrun cutoff is prevented during or directly after downshifting takes place; that is, the fuel metering is resumed. In addition, a higher quantity of mixture than the idle quantity is supplied for a short time to the engine 11. This can be done, for example, by opening an electrically-actuable throttle flap or (to a limited extent) by driving an idle actuator. In this way, the sudden build-up of a higher vehicle deceleration because of the downshifting is prevented than was effective before the downshift. Thereafter, the quantity of the mixture is continuously controlled down to the idle quantity. As soon as the idle quantity is reached, the overrun cutoff is triggered anew. The curve of this braking torque MB which adjusts at the transmission output is shown in FIG. 2 by the curve segment to the right of the switchover time point to. This curve clearly shows that the braking torque MB increases with less suddenness.

The second embodiment described above will now be explained in greater detail with respect to FIGS. 4 and 5.

Figure 5:
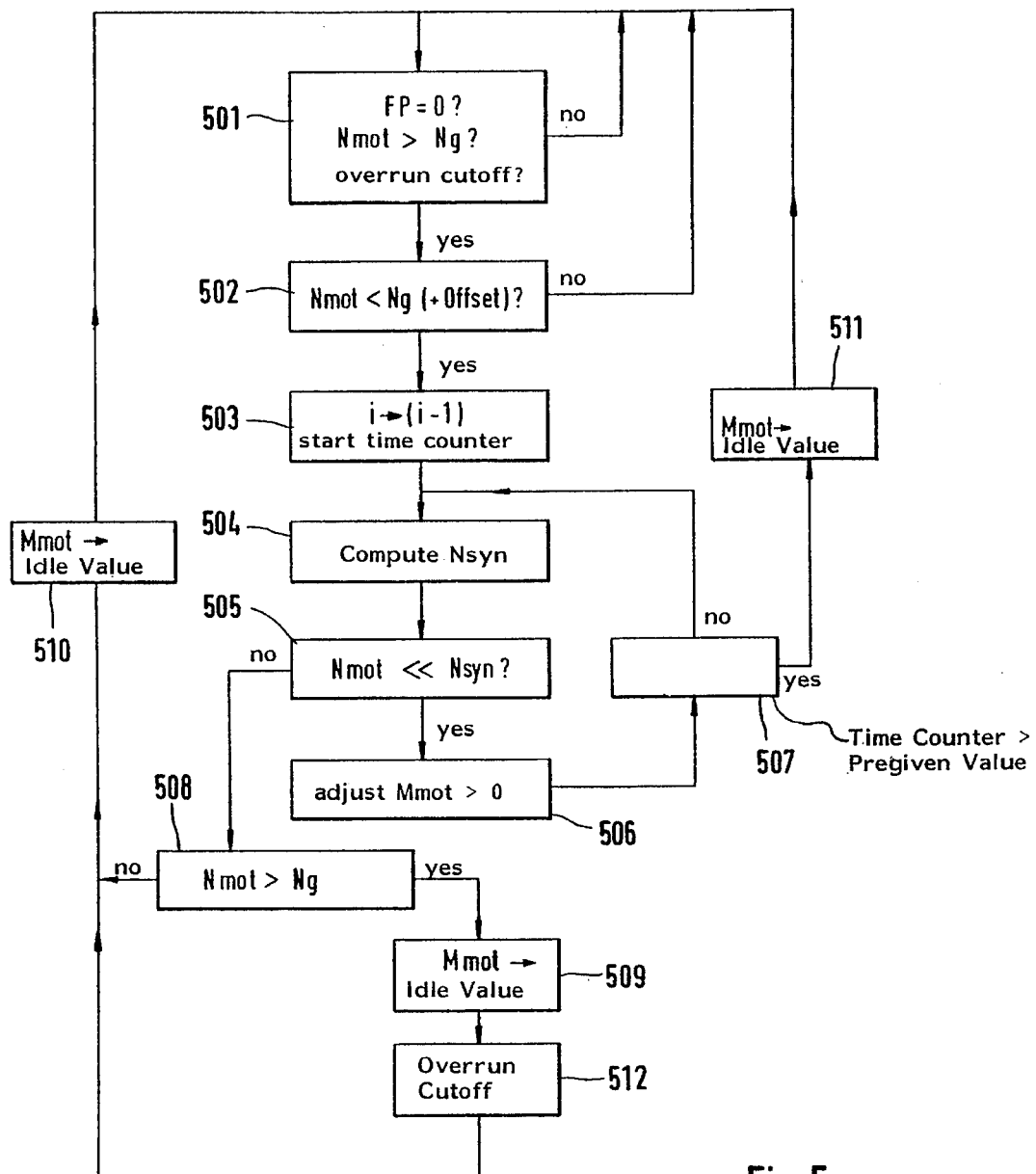

In step 501 of FIG. 5, an inquiry is made in the same manner as in step 31 in FIG. 3, namely, whether the overrun conditions (accelerator pedal in idle position, engine rpm above the resume rpm) are present. If this is the case, then, in step 502 as in step 32 of FIG. 3, an inquiry is made as to whether the engine rpm Nmot is less than the resume rpm Ng or whether there is a drop below a higher threshold (Ng+offset). If this is the case, then, in step 503, as in step 33 of FIG. 3, a downshift operation from the higher gear (i) to a lower gear (i−1) is triggered. At the same time, a time counter is started in step 503. In the next step 504, the synchronous rpm Nsyn is computed. The computation of the synchronous rpm Nsyn can, for example, take place by a multiplication of the new ratio (i−1) by the transmission output rpm Nab.

In step 505, an inquiry is made as to whether the actual engine rpm Nmot is much less than the computed synchronous rpm Nsyn. If the engine rpm is much less than the synchronous rpm, then, in step 506, a positively acting engine torque Mmot is set. This happens, as already mentioned, with an increase of the mixture quantity. In step 507, the time counter, which had been started in step 503, is compared to a pregiven value and the steps 504, 505 and 506 are run through until either the time counter exceeds the pregiven value or the engine rpm Nmot is in the order of magnitude of the synchronous rpm Nsyn (step 505).

If a determination is made in step 507 that the time counter has exceeded the pregiven value, then, in step 511, the engine torque is again brought to the idle value. This is achieved in that the mixture quantity is successively reduced. The reduction of the engine torque or the reduction of the mixture quantity can take place in accordance with any desired selectable function. For example, a ramp-shaped curve can be mentioned here. If a determination is made in step 505 that the engine rpm is in the order of magnitude of the synchronous rpm, then, in step 508, a determination is made as to whether the engine rpm Nmot is greater than the resume rpm Ng. If this is the case, then, in step 509, the engine torque is reduced as in step 511 and, in step 512, an overrun cutoff is again made. The step 510 is, in this case, without significance. If the engine rpm in step 505 is less than the resume rpm, the engine torque is successively reduced to the idle value in-step 510. The overrun cutoff, however, is omitted in this case.

Figure 4:
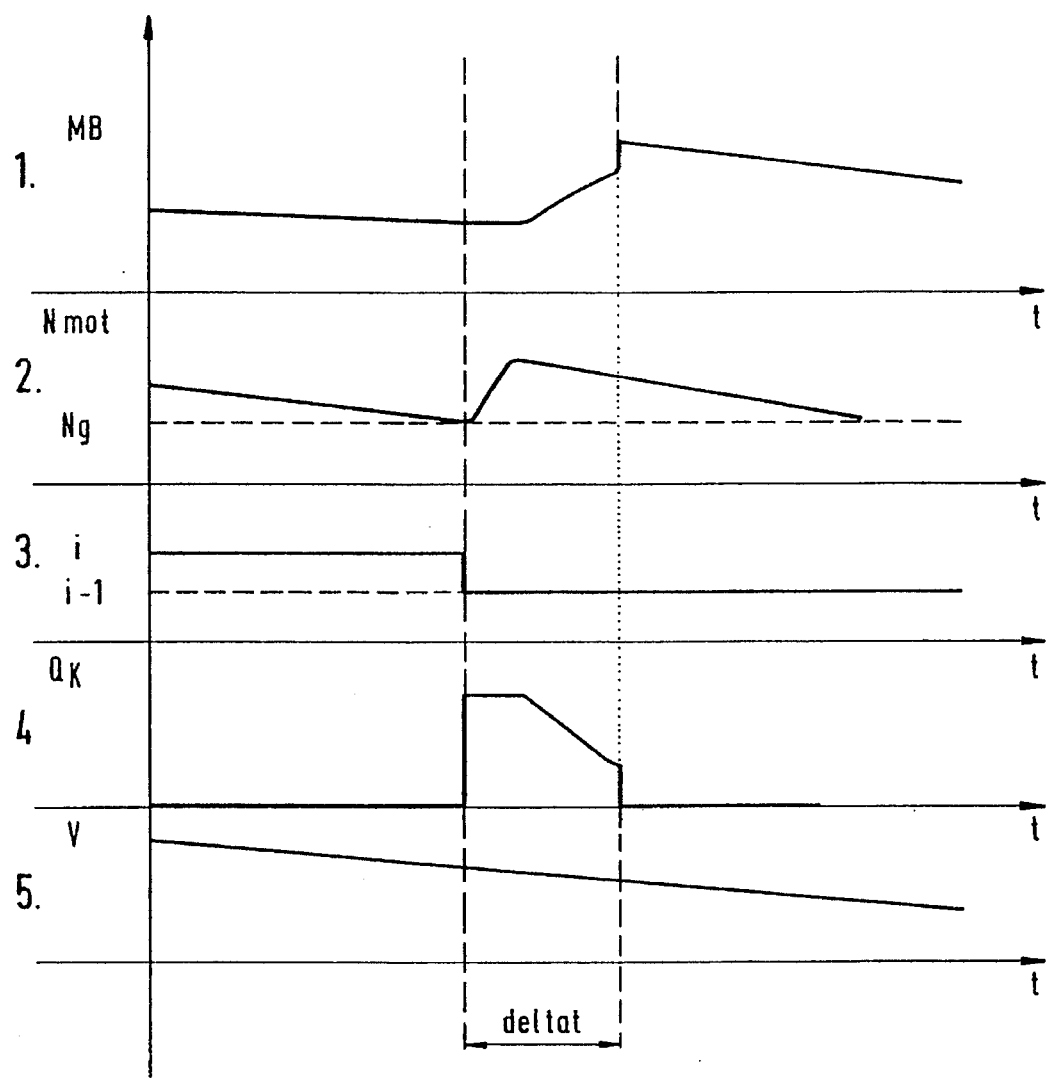

In FIG. 4, the signal curves are shown which result from the procedure shown in FIG. 5. The first curve shows the braking torque MB plotted as a function of time (t). The second curve shows the engine rpm Nmot and the third curve shows the gear shift as functions of time. The fourth curve shows the fuel quantity $Q_K$ and the fifth curve shows the road speed V of the vehicle or the transmission output rpm Nab as functions of time. At the start time point of the time interval deltat and according to the invention, the shifting operation from the higher gear (i) to the lower gear (i−1) is triggered (see curve 3 of FIG. 4). The engine rpm Nmot has reached the resume rpm Ng at this time point (see curve 2 of FIG. 4). By increasing the mixture quantity or the fuel quantity $Q_K$ (curve 4 of FIG. 4), the rpm Nmot of the engine increases until it reaches approximately the synchronous rpm. After reaching the synchronous rpm Nsyn, the metering of the mixture is reduced pursuant to any desired selectable function (see curve 4 of FIG. 4), whereby the braking torque MB effected by the engine increases as shown in the first curve of FIG. 4.

At the end of the time interval deltat, an overrun cutoff is again triggered as can be seen in the fourth curve of FIG. 4. In this way, the braking torque (first curve) increases to a maximum value whereby the desired deceleration takes place. The road speed V of the vehicle is then smooth as shown by the fifth curve of FIG. 4. The jump-like increase of the braking torque MB (curve a in FIG. 2), which is associated with the first embodiment, is significantly more comfortable because of the procedure provided by the second embodiment. In this connection, reference may be made to curve (b) of FIG. 2 or the first curve of FIG. 4.

As further embodiments of the invention, the downshifting from the ratio (i) into the lower ratio (i−1) (step 503 or step 33) is only then triggered when the driver actuates the brake pedal. In this way, cases are taken into account in which rolling of the vehicle in a high gear with idle mixture quantity or overrun cutoff is better adapted to the traffic situation than the downshifting to a lower gear and thereafter a renewed overrun cutoff. By actuating the brake pedal, the driver signals that a braking action, in any event, desired. A further supplement of the function described is the downshifting into a lower gear (step 503 or step 33) when the brake is actuated even when the engine rpm Mmot is still significantly greater than the resume threshold Ng. This is achieved in that the mentioned offset is selected to be adequately large in the steps 502 or 32 and the inquiry with this higher threshold only then takes place if the driver actuates the brake pedal. In this way, load is taken off the brakes, for example, during mountain driving.

Upshifting when the brakes are actuated can also be suppressed in addition to the active downshifting with the brakes actuated. The upshifting is then purposefully suppressed even after releasing the brake pedal until the driver again steps on the accelerator pedal.

When the vehicle is rolling with the accelerator pedal not depressed, the portion of the overrun cutoff phase is increased by the downshifting of the transmission thereby saving fuel. The greater braking action of the drive train which then occurs is, in most cases, desired and removes load from the brakes.

According to the invention, driving comfort can be increased by an active revving up of the engine.

It is understood that the foregoing description is that of the preferred embodiments of the invention and that various changes and modifications may be made thereto without departing from the spirit and scope of the invention as defined in the appended claims.

What is claimed is:

1. A method for controlling the operating sequences in a motor vehicle equipped with an internal combustion engine to which a fuel quantity $Q_K$ and an air quantity $Q_L$ are supplied and equipped with an automatic transmission having a changeable transmission ratio, the method comprising the steps of:

making a first comparison of at least one of the engine rpm (Nmot), the transmission input rpm (NE) and the transmission output rpm (Nab) to a first threshold value (Ng);

detecting an overrun operation in dependence upon the position of the accelerator pedal actuated by the driver and said comparison;

making a second comparison of at least one of the engine rpm (Nmot), the transmission input rpm (NE) and the transmission rpm (Nab) to at least one of said first threshold value (Ng) and a second threshold value (Ng+offset); and, when overrun operation is detected, triggering a downshift operation (i→(i−1)) of the transmission in dependence upon said second comparison.

2. The method of claim 1, after triggering said downshift operation (i→(i−1)) and after again detecting overrun operation, the method further comprising reducing the fuel quantity ($Q_K$) relative to the normal operation.

3. The method of claim 1, further comprising increasing the engine torque (Mmot) relative to the torque present during overrun operation at one of the following time points: a short time before, a short time after and simultaneously with said triggering of said downshift operation (i→(i−1)).

4. The method of claim 3, wherein said engine torque (Mmot) is increased by supplying a mixture quantity fuel/air ($Q_K/Q_L$) which is greater relative to the mixture quantity fuel/air ($Q_K/Q_L$) during overrun operation.

5. The method of claim 3, wherein, after the increase of said engine torque (Mmot), said engine torque (Mmot) is again reduced pursuant to one of the following functions: a desired selectable time-dependent function and a function dependent upon operating parameters of the motor vehicle.

6. The method of claim 5, wherein the reduction of said engine torque (Mmot) is achieved by reducing the mixture quantity fuel/air ($Q_K/Q_L$).

7. The method of claim 4, wherein said mixture quantity fuel/air ($Q_K/Q_L$) is increased by actuating at least one of the following: an idle actuator and an electrically displaceable throttle flap.

8. The method of claim 5, wherein, after the engine torque (Mmot) is increased, the engine torque (Mmot) is reduced in the form of a ramp within a selectable time interval (deltat).

9. The method of claim 1, wherein said downshift operation (i→(i−1)) is only triggered when the brake is actuated by the driver of the motor vehicle.

10. An arrangement for controlling the operating sequences in a motor vehicle equipped with an internal combustion engine to which a fuel quantity $Q_K$ and an air quantity $Q_L$ are supplied and with an automatic transmission having a changeable transmission ratio, the arrangement comprising:

means for making a first comparison of at least one of the engine rpm (Nmot), the transmission input rpm (NE) and the transmission output rpm (Nab) to a first threshold value (Ng);

means for detecting an overrun operation in dependence upon the position of the accelerator pedal actuated by the driver and said comparison;

means for making a second comparison of at least one of the engine rpm (Nmot), the transmission input rpm (NE) and the transmission rpm (Nab) to at least one of said first threshold value (Ng) and a second threshold value (Ng+offset); and, means for triggering a downshift operation (i→(i−1)) of the transmission in dependence upon said second comparison when overrun operation is detected.

* * * * *

UNITED STATES PATENT AND TRADEMARK OFFICE
CERTIFICATE OF CORRECTION

PATENT NO. : 5,505,671

DATED : April 9, 1996

INVENTOR(S) : Martin Streib and Hong Zhang

It is certified that error appears in the above-identified patent and that said Letters Patent is hereby corrected as shown below:

On the title page, at [57] ABSTRACT, line 22: between "to" and "more", please insert -- be --.

In column 1, line 62: between "speed" and "and", please insert -- , --.

In column 1, line 62: between "rpm" and "drop", please insert -- , --.

In column 2, line 31: please delete "tile" and substitute -- the -- therefor.

In column 2, line 63, between "cases" and "desirable", please insert -- , --.

In column 3, line 33: between "that" and "downshift", please insert -- the --.

In column 3, line 59: please delete "operating/parameters" and substitute -- operating parameters -- therefor.

In column 5, line 13: please delete "to" and substitute -- t0 -- therefor.

UNITED STATES PATENT AND TRADEMARK OFFICE
CERTIFICATE OF CORRECTION

PATENT NO. : 5,505,671
DATED : April 9, 1996
INVENTOR(S) : Martin Streib and Hong Zhang It is certified that error appears in the above-identified patent and that said Letters Patent is hereby corrected as shown below:

In column 5, line 37: please delete " point to." and substitute -- point t0. -- therefor.

In column 6, line 17: please delete "in-step" and substitute -- in step -- therefor.

In column 6, line 58, between "event," and "desired.", please insert -- is --.

Signed and Sealed this

Fifteenth Day of July, 1997

Attest:

BRUCE LEHMAN

Attesting Officer

Commissioner of Patents and Trademarks